US005914747A

United States Patent [19]
Hamilton

[11] Patent Number: 5,914,747
[45] Date of Patent: Jun. 22, 1999

[54] AUTOMATIC CONTROL OF VIDEO CONFERENCE MEMBERSHIP

[75] Inventor: Chris Hamilton, Montclair, N.J.

[73] Assignee: Dialogic Corporation

[21] Appl. No.: 09/098,697

[22] Filed: Jun. 17, 1998

[51] Int. Cl.[6] .................................................. H04N 7/14
[52] U.S. Cl. .................................. 348/15; 348/14; 348/17
[58] Field of Search .................................. 348/14, 15, 17

[56] References Cited

U.S. PATENT DOCUMENTS

| | | | |
|---|---|---|---|
| 4,698,666 | 10/1987 | Lake, Jr. et al. ........................ | 358/22 |
| 5,585,839 | 12/1996 | Ishida et al. ............................. | 348/15 |
| 5,715,302 | 2/1998 | Lee .................................... | 379/100.16 |
| 5,745,161 | 4/1998 | Ito ........................................ | 348/15 |

Primary Examiner—Curtis A. Kuntz
Assistant Examiner—Melur Ramakrishnaiah
Attorney, Agent, or Firm—Kaplan & Gilman, LLP

[57] ABSTRACT

A video conferencing system which allows the various conferees to control the signals received by one or more particular other conferees in the conference. Voice activation or motion detection or other techniques may be utilized to implement such control.

6 Claims, 3 Drawing Sheets

AUTOMATIC CONTROL OF VIDEO CONFERENCE MEMBERSHIP

TECHNICAL FIELD

This invention relates to video conferencing, and more specifically, to an improved technique of allowing various members of a video conference to control the audio and video signals sent to other conferees in the conference. In particular embodiments, items such as motion detection, image recognition, voice activity detection, as well as others, are used to control entry to and exit from the conference, and are also used to control parameters of the conference.

BACKGROUND OF INVENTION

Video conferencing is a technique utilized in order to provide both video and audio information from one or more users to one or more other users. Typically, a conference bridge is utilized to connect several participants of the video conference, and the signal received at the conference bridge from each conferee is broadcast to the other conference members. As a conferee uses the conference station, he/she views separate images from each of the other conference stations. conferences may include two or more participants.

FIG. 2 shows an example of a conference station as viewed by a conferee participating in a conference with four other conferees. As seen in FIG. 2, the video information from each of the four other conferees is displayed on a conference station video monitor, usually a personal computer. In this example, conferee 2 is missing, since it is the conference station of conferee 2 being viewed. Of course, a conferee may choose to see his own image on screen.

Recently, much of the available conferencing technology is becoming focused on digital techniques. More specifically, with the availability of Internet access becoming less expensive and more widespread, it has become possible to implement the video conferences over the Internet or other similar data networks. Implementation of such conferences in the digital domain provides improved clarity, availability of compression techniques, etc. Additionally, with the price of personal computers getting lower and the speed of such computers increasing, it is possible to very inexpensively implement functions such as speech recognition, image processing, etc. Little advantage has been taken of the additional capabilities available in PC-based conference stations, and more particularly, of the ability of such conference stations to provide advanced signal processing functions.

There has been little research to date focused upon taking advantage of the additional capabilities of implementing video conferencing in the digital domain. Specifically, possible added control capabilities of PC based video conference stations have been underutilized.

SUMMARY OF THE INVENTION

The above and other problems of the prior art are overcome in accordance with the present invention which relates to an improved video conferencing system which provides for additional control capabilities based upon information deduced from various parameters. Technologies utilized include detection of a conferee in front of his/her conference station using motion detection, voice recognition or other such items. In response to detecting that a conferee is not proximate to a conference station, the video information is not transmitted from that conference station, in order to save bandwidth.

DETAILED DESCRIPTION OF THE PREFERRED EMBODIMENT

Figure 1:
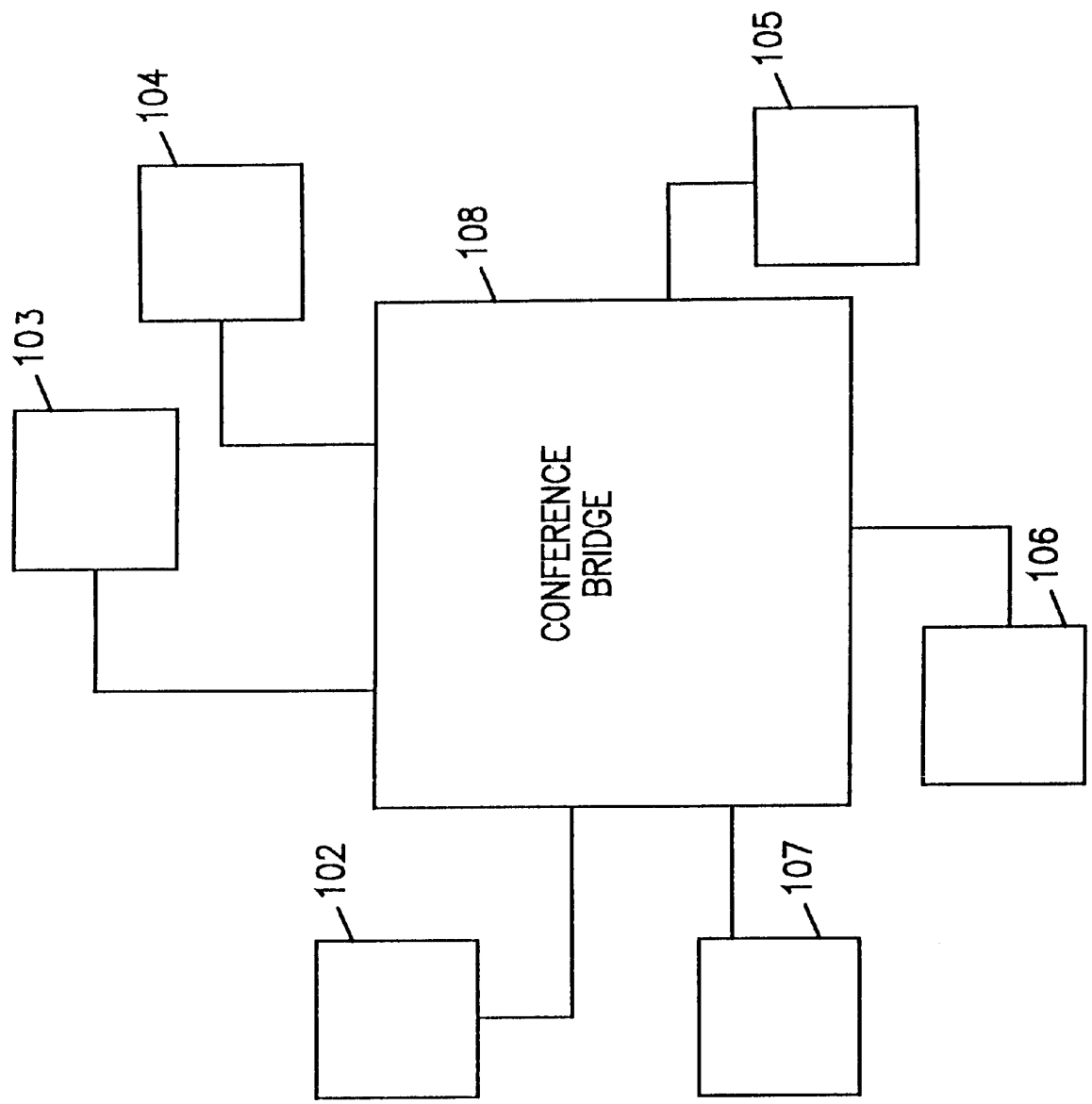
FIG. 1 shows a conceptual diagram of a video conferencing arrangement.
Figure 2:
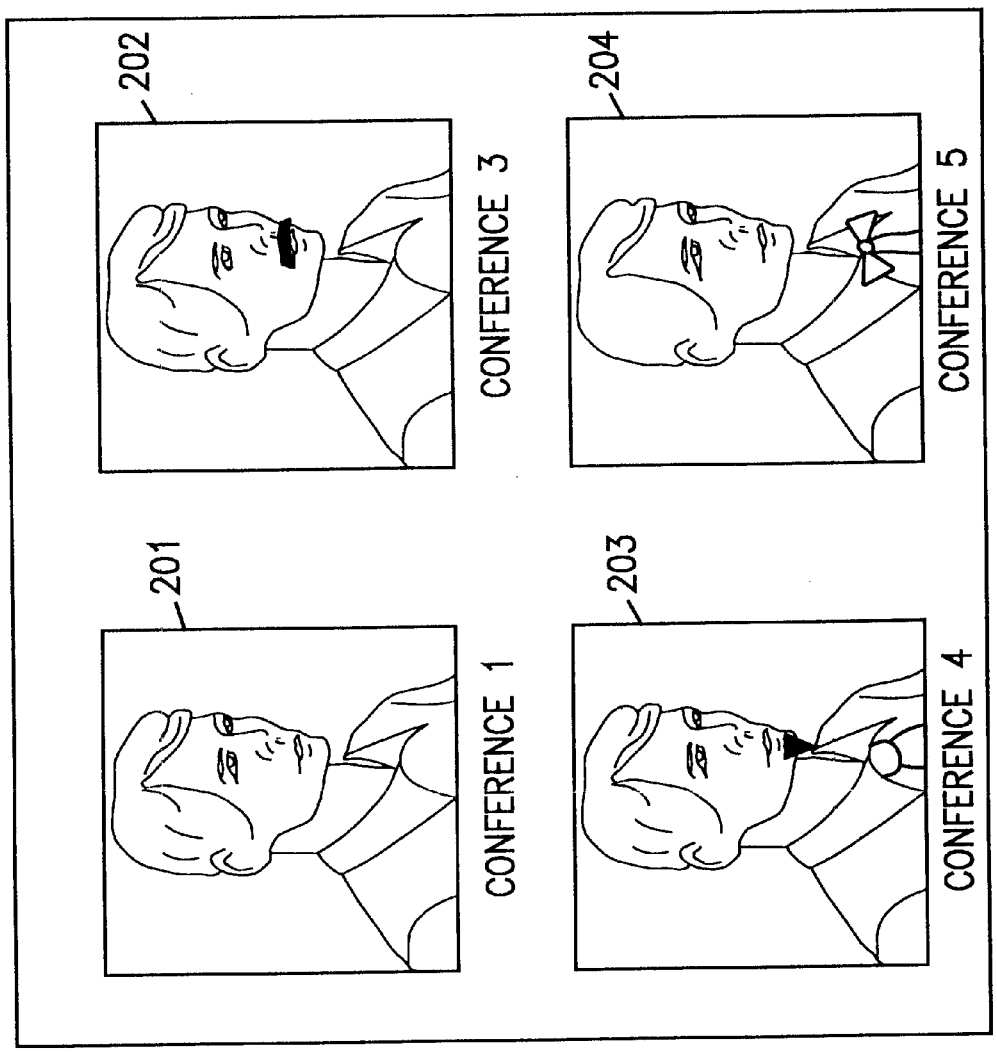
FIG. 2 depicts an exemplary video screen showing four conferees.
Figure 3:
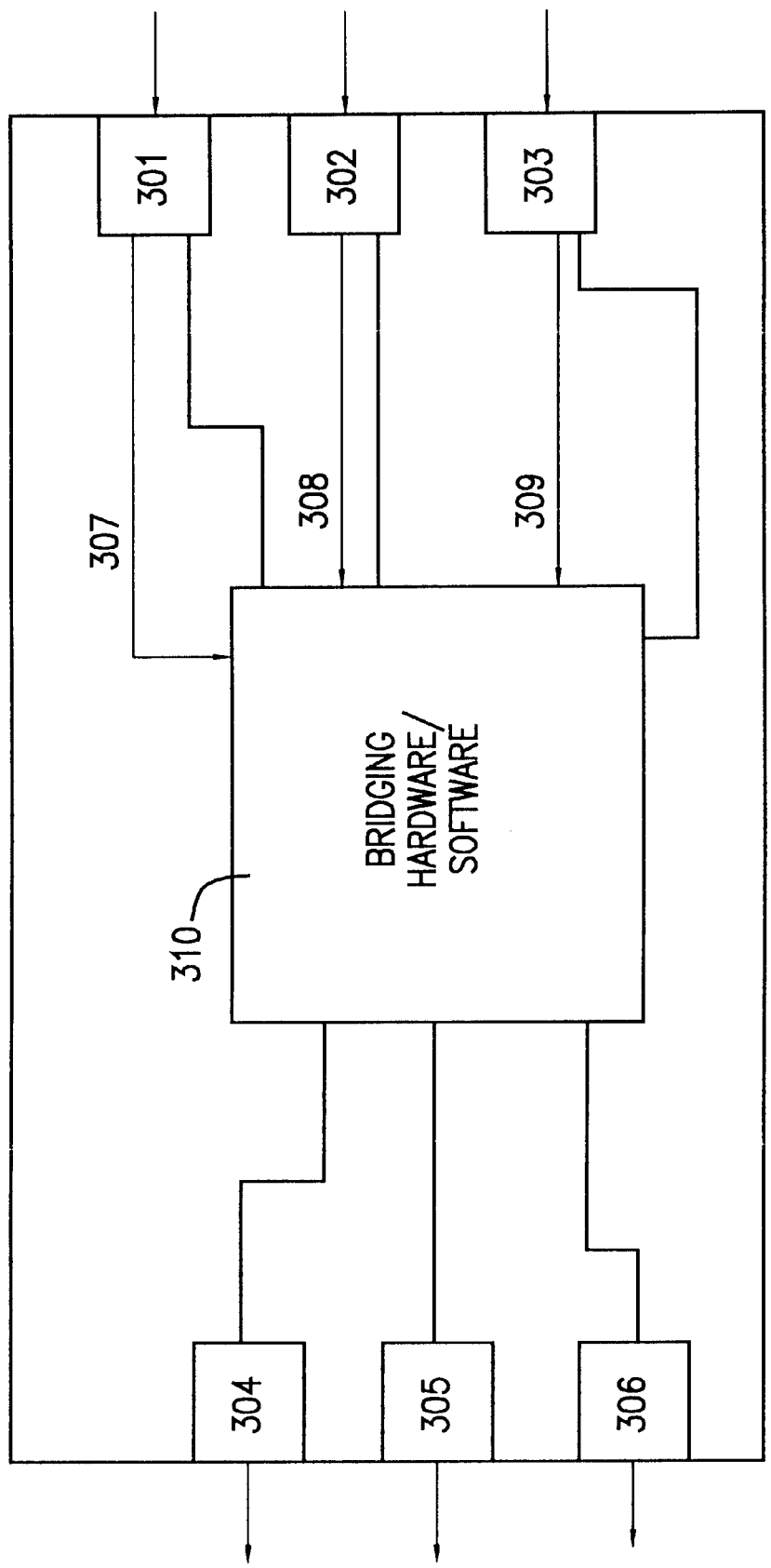
FIG. 3 depicts a slightly more detailed diagram of a conference bridge for use with the present invention.

FIG. 1 shows a typical conference bridge arrangement for implementing a multi-party video conference. The arrangement shown in FIG. 1 includes a conference bridge 108 and a plurality of conference stations 102–107. The conference bridge 108 is implemented from well-known off the shelf components. The conference bridge 108 receives video and audio signals from conference stations 102–107, and transmits to each conference station a signal indicative of the video and audio from all of the other conferencing stations.

In accordance with one embodiment of the present invention, a video conference proximity detection system is utilized at each conference station 102–107 in order to allow conferees to exit and enter the conference automatically. Specifically, if the proximity detector located at, for example, conference station 102, detects that there is no human sitting nearby the conference station 102, then the conference station is automatically eliminated from the currently executing conference. The elimination of one or more conference stations when conferees leave their conference station temporarily saves network bandwidth, as it does not require a video and audio signal to be transmitted from that particular conference station to the remaining set of conferees.

In one exemplary implementation, a motion detector is utilized nearby each conference station in order to determine when conferees should enter and leave the conference. The motion detectors may be typical of those used in the security alarm monitoring business, or may be of any other available type. Moreover, the absence of a conferee in front of the conference station may trigger the elimination of video information from the conference, but not audio information. In this manner, if one of the conferees walks away from the conference station, the video signal will be eliminated, thereby saving valuable bandwidth. Nonetheless, the audio signal from that conferee will continue to be broadcast to the remaining conferees. Thus, a conferee can keep talking and remain part of the conference when he/she walks around the room, yet bandwidth will not be wasted by sending a useless video image of which the conferee is not a part.

Video activity may be defined as a measure of the rate of change of the encoded image. If the rate of change is greater than a particular value, it means that the individual is still probably sitting next to the conference station, as individuals are unlikely to be very still for long amounts of time. The level of video activity may therefore be used to determine the proximity of a conferee to the workstation and to control the conference.

In an additional embodiment of the invention, image recognition software may be employed to determine the proximity of the conferee to the conference workstation. Image recognition software is well known to those skilled in the art of video conference technology and such software can be used in the instant embodiment to: (1) detect the presence or absence of the image of the conference member within the camera field of the conference workstation, and (2) forward this information to the video conferencing system for the purpose of controlling conference membership.

An additional embodiment employs an advantageous combination of voice activity detection and image recognition software for the purpose of determining the proximity of the conferee to the conference workstation. Voice activity detectors are well known to those skilled in the art of video conferencing. In this example, a voice activity detector combined with image recognition software employed as described above, can be used to accurately determine the presence or absence of the conference member with respect to the conference workstation.

The above describes the preferred embodiments of the invention. Various modifications and additions will be apparent to those of skill in the art.

I claim:

1. A video conferencing system comprising:

a plurality of video conference stations;

a conference bridge operable to place the video conference stations in audio and video communication with one another by receiving a first video signal and a first audio signal transmitted from a first video conference station and by transmitting, to at least some of the video conference stations, a second signal indicative of the received first video and first audio signals; and means for changing a video image presented to at least some of the video conference stations in response to detecting whether a conferee is located proximate to the first video conference station, said means operable to diminish the first video signal transmitted from the first video conference station while maintaining at least audio communication therefrom.

2. The system of claim 1 further comprising a voice activity detector for assisting in determining whether a conferee is proximate to a video conference station.

3. A video conference system comprising:

a plurality of video conference stations connected through a conference bridge via video and audio transmissions to form a video conference;

detecting means at each video conference station that detects the presence or absence of a conferee proximate to said video conference station; and means responsive to said detecting means for stopping video transmission from a first video conference station to the conference bridge when said detecting means detects the absence of said conferee proximate to said first video conference station while audio transmission continues.

4. The system of claim 3 wherein said detecting means comprises means for determining the rate of change of video information, and for deeming the conferee not present proximate to said video conference station if said rate of change is below a predetermined value.

5. The system of claim 4 further comprising means for adding a border around a selected video image.

6. A video conferencing system comprising:

a plurality of video conference stations operable to communicate with one another via at least one of either audio or video transmissions;

a detector for determining the presence or absence of a conferee proximate to at least one of said video conference stations, and means for deleting video transmission from the one video conference station when said conferee is no longer proximate to said one video conference station; and while audio transmission continues; and means for automatically re-establishing the video transmission from the one video conference station when the conferee again becomes proximate to said one video conference station.

* * * * *